(12) United States Patent
McCall et al.

(10) Patent No.: US 7,254,172 B1
(45) Date of Patent: Aug. 7, 2007

(54) FILTER CONTROL FOR VARYING DATA RATE COMMUNICATION CHANNELS

(75) Inventors: Kevin Jon McCall, Lafayette, CO (US); Baker Perkins Lee Scott, III, Boulder, CO (US); Marvin L. Vis, Longmont, CO (US)

(73) Assignee: Cirrus Logic, Inc, Austin, TX (US)

( * ) Notice: Subject to any disclaimer, the term of this patent is extended or adjusted under 35 U.S.C. 154(b) by 1058 days.

(21) Appl. No.: 10/117,467

(22) Filed: Apr. 4, 2002

(51) Int. Cl.
*H03H 7/30* (2006.01)
*H04L 23/00* (2006.01)

(52) U.S. Cl. ...................... 375/232; 375/377

(58) Field of Classification Search ............... 375/327, 375/225, 319, 229, 130, 232–234, 377, 316, 375/350, 230; 360/51; 341/108, 110; 333/18, 333/28 R
See application file for complete search history.

(56) References Cited

U.S. PATENT DOCUMENTS

| | | | |
|---|---|---|---|
| 5,083,571 A * | 1/1992 | Prichep ...................... 600/544 |
| 5,327,302 A * | 7/1994 | Khoury et al. ................ 360/65 |
| 5,422,760 A | 6/1995 | Abbott et al. |
| 5,432,513 A * | 7/1995 | Okamoto ..................... 341/108 |
| 5,463,603 A * | 10/1995 | Petersen ...................... 360/67 |
| 5,682,125 A * | 10/1997 | Minuhin et al. .............. 333/18 |
| 5,764,428 A | 6/1998 | Soda |
| 5,903,857 A | 5/1999 | Behrens et al. |
| 6,304,134 B1 * | 10/2001 | Pavan ........................ 327/552 |
| 6,522,489 B1 * | 2/2003 | Nagaraj ....................... 360/32 |
| 6,643,787 B1 * | 11/2003 | Zerbe et al. ................ 713/400 |

FOREIGN PATENT DOCUMENTS

| GB | 2369021 A | 5/2002 |
|---|---|---|
| JP | 10-289531 | * 9/1997 |

OTHER PUBLICATIONS

Choi, Davy, "An Analog Front-End Signal Processor for 64Mb/s PRML Hard-Disk Drive Channel," IEEE International Solid-State Circuits Conference, (1994) Feb., New York.

Khoury, John M., "A 15MHz CMOS Continuous-Time Bessel Filter for Disk Drives," IEEE International Solid-State Circuits Conference (1991) Feb., New York.

Kim, Beomsup, et al., "An Integrated CMOS Mixed-Mode Signal Processor for Disk Drive Read Channel Applications," IEEE Transactions on Circuits and Systems II: Analog and Digital Signal Processing (1994) Jan., No. 1, New York.

* cited by examiner

*Primary Examiner*—Tesfaldet Bocure
(74) *Attorney, Agent, or Firm*—Dan Shifrin

(57) ABSTRACT

Processing circuitry includes an analog filter and filter control circuitry and processes an analog signal having a varying data rate. The analog filter filters the analog signal based on a transfer characteristic to transfer a filtered signal. The filter control circuit processes a data clock signal corresponding to the varying data rate and a reference clock signal to generate a filter control signal to adjust the transfer characteristic in proportion to the varying data rate. The analog filter adjusts the transfer characteristic in proportion to the varying data rate in response to the filter control signal. The processing circuitry may be implemented in a tape, magnetic, or optical drive.

14 Claims, 5 Drawing Sheets

FILTER CONTROL FOR VARYING DATA RATE COMMUNICATION CHANNELS

BACKGROUND OF THE INVENTION

1. Field of the Invention

The invention is related to the field of analog filters, and in particular, to the control of an analog filter operating on a communication channel based on the varying data rate of the communication channel.

2. Statement of the Problem

In a tape drive, a magnetic head reads a magnetic tape and generates a corresponding analog signal that represents the data stored on the tape. The data rate of the analog signal depends on the speed of the tape drive. The speed of the tape drive varies to accommodate system requirements and may also vary because of mechanical imperfections and environmental changes. This speed variance causes a corresponding change in the data rate of the analog signal.

An analog filter processes the analog signal based on a transfer function. For example, a low-pass analog filter may remove noise by attenuating signal energy that is outside of a passband. The passband is centered around the expected data rate, so the analog filter will pass energy at frequencies near the expected data rate, but will remove noise by attenuating energy at frequencies that are not close to the expected data rate.

Unfortunately, as the speed of the tape drive varies, the frequency of the data rate shifts. In the above example, the actual data rate may shift away from the expected data rate, and thus, the frequency for the actual data rate may shift outside of the passband for the low-pass filter. Thus, signal energy at the actual data frequency would be attenuated by the analog filter before the signal is processed by downstream components. For example, the filtered signal may be sampled by an analog-to-digital converter, and the undesirable attenuation may have a significant negative impact on sampling quality. Poor sampling quality adversely affects the overall quality of the tape drive.

In some applications, a current signal controls the frequency of an oscillator in a phase lock loop, and hence, controls the sampling frequency of the analog-to-digital converter in response to the varying data rate. The current signal can also be used to adjust the analog filter settings. Unfortunately, this solution may not be accurate enough for all applications, especially in the presence of changing environmental conditions. For example, this technique may not work well at operational temperatures that are hotter than expected.

SUMMARY OF THE SOLUTION

The invention helps solve the above problems with technology that adjusts the filter characteristic of an analog filter in proportion to the varying data rate. Advantageously, the analog filter will not seriously mis-process the analog signal in the presence of a varying data rate, for example, by attenuating energy at the actual data rate. This technology can be more accurate than previous techniques using current signals, especially in the presence of changing environmental conditions. Examples of the invention include both processing circuitry and methods to process an analog signal having a varying data rate. The processing circuitry includes an analog filter and filter control circuitry.

In some examples of the invention, the analog filter is configured to filter the analog signal based on a transfer characteristic to transfer a filtered signal. The filter control circuit is configured to process a data clock signal corresponding to the varying data rate and a reference clock signal to generate a filter control signal to adjust the transfer characteristic in proportion to the varying data rate. The analog filter is configured to adjust the transfer characteristic in proportion to the varying data rate in response to the filter control signal. In some examples of the invention, the transfer characteristic is configured for an expected data rate during a calibration phase, and the transfer characteristic is adjusted in proportion to the varying data rate during an operational phase.

In some examples of the invention, the filter control circuit is configured to determine a first relationship between the data clock signal and the reference clock signal during a calibration phase and determine a second relationship between the data clock signal and the reference clock signal during an operational phase. The filter control circuit is configured to generate the filter control signal based on a difference between the first relationship and the second relationship. In some examples of the invention, the filter control circuit is configured to determine a first reference clock count and a first data clock count during the calibration phase and determine a second reference clock count and a second data clock count during the operational phase. The first relationship comprises a first ratio of the first reference clock count and the first data clock count, and the second relationship comprises a second ratio of the second reference clock count and the second data clock count.

In some examples of the invention, the varying data rate corresponds to a varying data speed of a tape drive. In some examples of the invention, the analog filter and the filter control circuit comprise read channel circuitry for a tape drive.

DESCRIPTION OF THE DRAWINGS

The same reference number represents the same element on all drawings.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
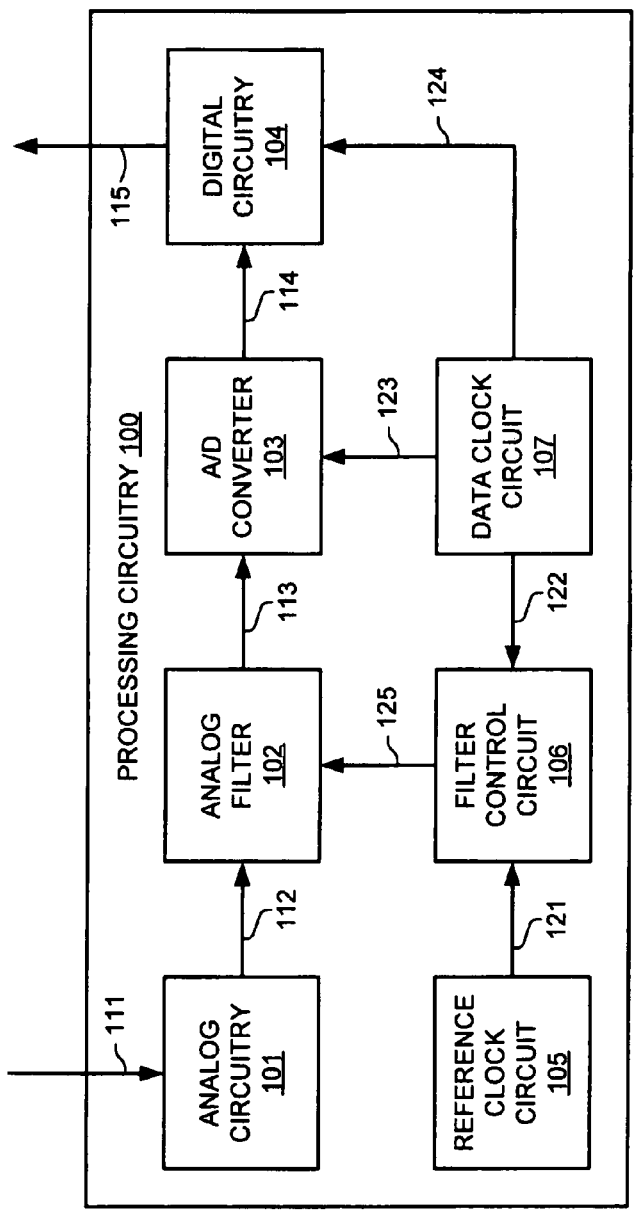
FIG. 1 illustrates processing circuitry in an example of the invention.

FIG. 1 illustrates processing circuitry 100 in an example of the invention. Processing circuitry 100 includes analog circuitry 101, analog filter 102, Analog-to-Digital (A/D) converter 103, digital circuitry 104, reference clock circuit 105, filter control circuit 106, and data clock circuit 107. Elements 101-105 and 107 of processing circuitry 100 could be conventional. Based on this disclosure, those skilled in the art will appreciate how to make and use filter control circuit 106 and processing circuitry 100. Processing circuitry 100 could be integrated within memory systems, such as tape drives, optical drives, and magnetic disk drives. Processing circuitry 100 could be integrated within communication systems, such as wireless receivers. Processing circuitry 100 could also be integrated within other systems.

Analog circuitry 101 could be any circuitry that receives an input signal 111 and transfers analog signal 112. Some examples of analog circuitry include antennas, communication ports, magnetic and optical heads, and optical to electrical converters.

Analog filter 102 could be any filter that filters analog signal 112 based on a transfer characteristic to transfer filtered signal 113. Analog filter 102 also adjusts the transfer characteristic in response to filter control signal 125.

A/D converter 103 could be any component that samples filtered signal 113 to transfer digital signal 114. Digital signal 114 represents analog signals 111-113. Signals 111-113 have a varying data rate. For example, signal 111 may come from a memory tape where the data rate varies with the varying speed of the tape drive. A/D converter 103 samples filtered signal 113 at the varying data rate indicated by data clock signal 123.

Digital circuitry 104 could be any circuitry that receives digital signal 114 and transfers output signal 115. Some examples of digital circuitry 104 include memory system read channel circuitry, digital signal processing circuitry, and communications controller circuitry.

Reference clock circuit 105 could be a crystal oscillator or some other mechanism to transfer reference clock signal 121. Reference clock signal 121 typically has a fixed frequency.

Data clock circuit 107 could be any circuitry that provides data clock signal 122 that is proportional to the varying data rate. In some examples of the invention, data clock circuit 107 receives a signal (not shown) representing the varying data rate, and multiplies this signal to generate data clock signal 122. Data clock circuit 107 also provides data clock signals 123-124 respectively to analog-to-digital converter 103 and digital circuitry 104. Data clock signals 123-124 are also proportional to the varying data rate and may actually be the same signal as data clock signal 122.

Filter control circuit 106 could be any circuitry that processes reference clock signal 121 and data clock signal 122 to generate filter control signal 125. Data clock signal 122 corresponds to the varying data rate of signals 111-113. In response to filter control signal 125, analog filter 102 adjusts its transfer characteristic in proportion to the varying data rate.

The operation of analog filter 102 and filter control circuitry 106 can be separated into two phases—a calibration phase and an operational phase. In the calibration phase, analog filter 102 is initially configured with a reference transfer characteristic. In the operational phase, analog filter 102 adjusts the transfer characteristic in proportion to the varying data rate in response to filter control signal 125.

In some examples of the invention, the filter adjustments could be made by switching more or less load into the filter nodes, and filter control signal 125 could provide this dynamic loading. In other examples of the invention, the filter adjustments could be made by changing the transconductance via current tuning in the filter transfer stages.

Figure 2:
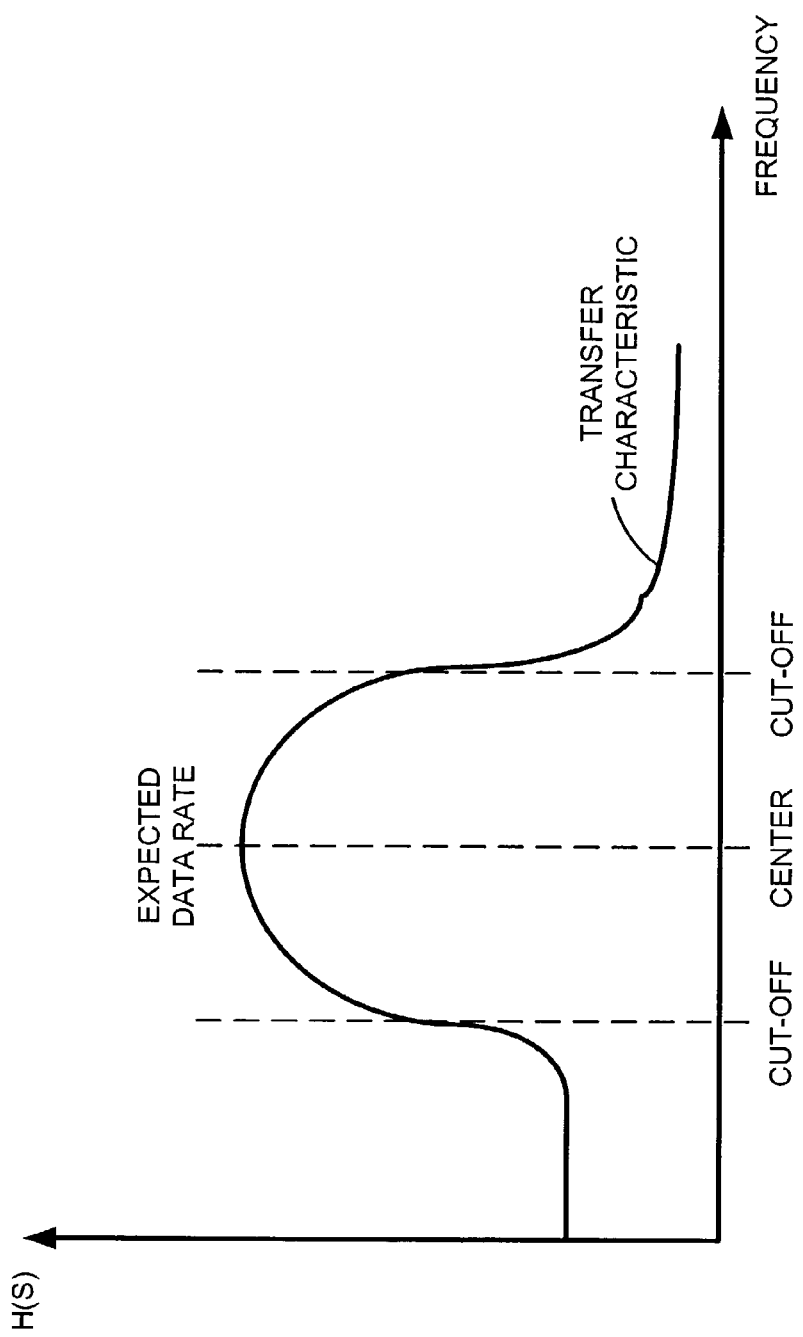
FIG. 2 illustrates an example of a transfer characteristic for an analog filter during a calibration phase in an example of the invention.

FIG. 2 illustrates an example of a transfer characteristic for analog filter 102 during the calibration phase in an example of the invention. The horizontal axis represents frequency, and the vertical axis represents the transfer function H(s) of analog filter 102. The transfer function represents an amount of signal energy that is transferred by analog filter 102. Thus, the transfer characteristic of FIG. 2 illustrates the amount of energy that analog filter 102 transfers at various frequencies. The transfer characteristic of FIG. 2 is for a low pass boost filter that passes signal energy at lower frequencies, and attenuates signal energy at higher frequencies. The frequencies where signal energy is passed are referred to as the passband. The passband is bounded by cut-off frequencies and has a center frequency in the middle of the cut-off frequencies. During the calibration phase, analog filter 102 is configured so the transfer characteristic is positioned with its center frequency at the expected data rate of signals 111-113.

Figure 3:
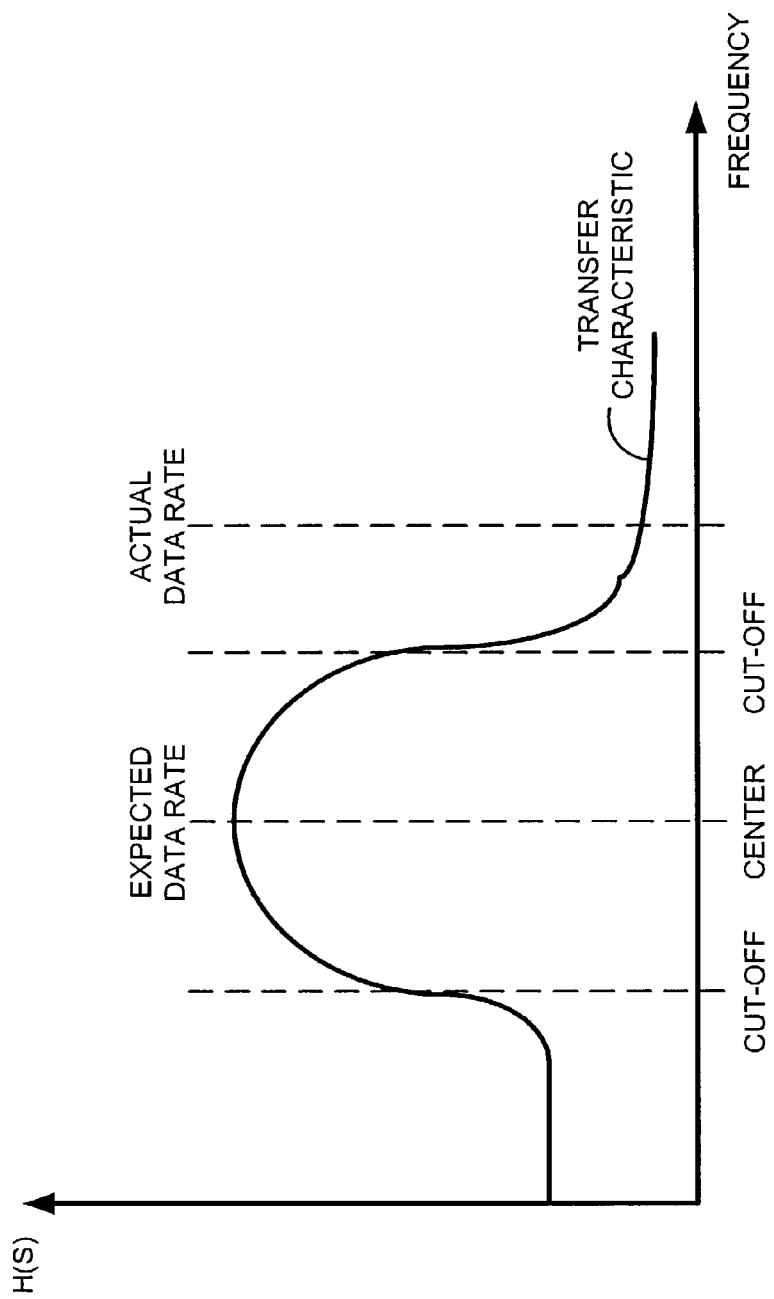
FIG. 3 illustrates an example of the transfer characteristic for the analog filter before adjustment during an operational phase in an example of the invention.

FIG. 3 illustrates an example of the transfer characteristic for analog filter 102 before adjustment during the operational phase in an example of the invention. The horizontal axis represents frequency, and the vertical axis represents the transfer function H(s) of analog filter 102. Because the data rate of signals 111-113 varies in operation, the actual data rate may not match the expected data rate. On FIG. 3, the actual data rate is beyond the upper cut-off frequency. Unfortunately, analog filter 102 is now attenuating signal energy at the frequency that A/D converter 103 is using to sample filtered signal 113.

Figure 4:
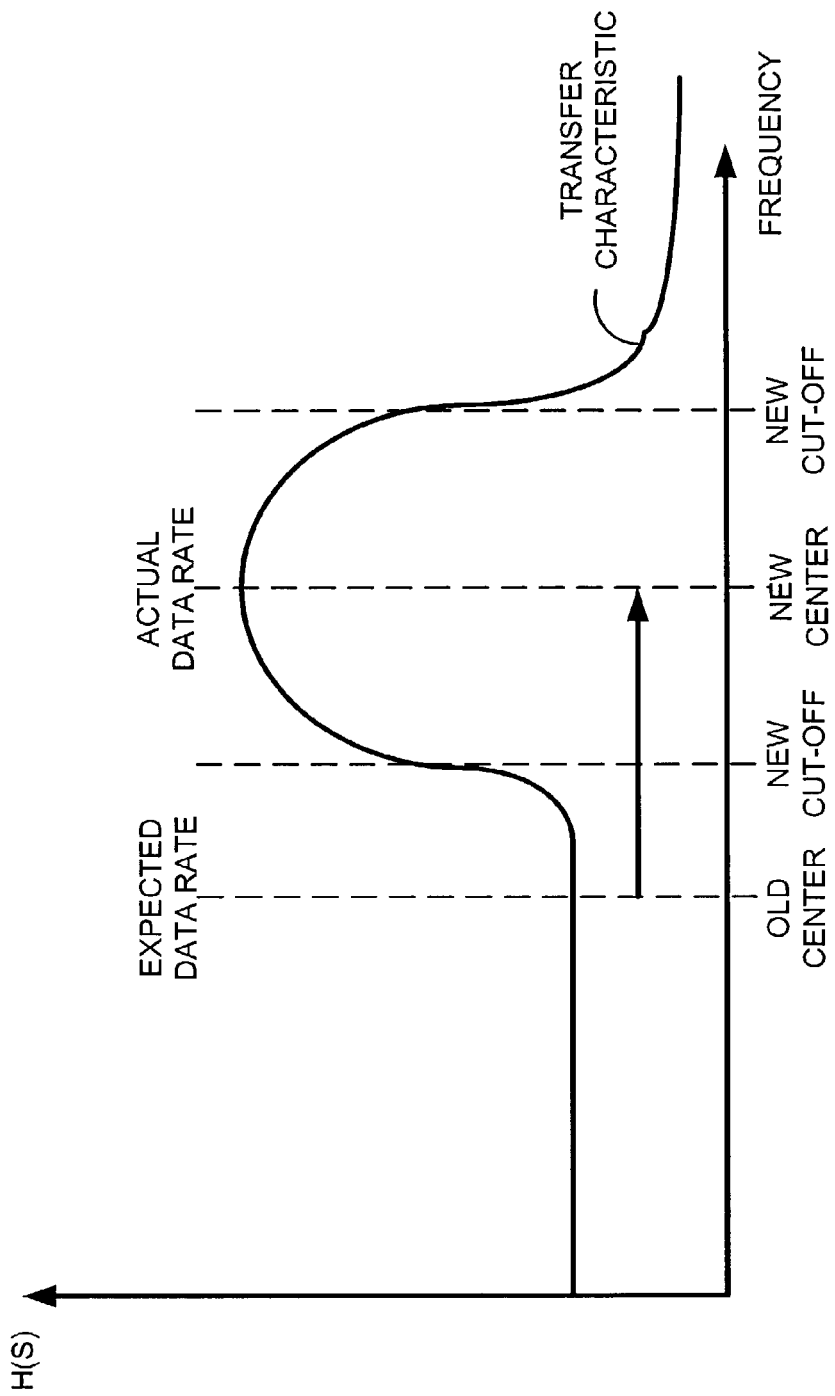
FIG. 4 illustrates an example of the transfer characteristic for the analog filter after adjustment during the operational phase in an example of the invention.

FIG. 4 illustrates an example of the transfer characteristic for analog filter 102 after adjustment during the operational phase in an example of the invention. The horizontal axis represents frequency, and the vertical axis represents the transfer function H(s) of analog filter 102. As indicated by the arrow, the transfer characteristic has moved from the old center frequency at the expected data rate to the new center frequency at the actual data rate. The new cut-off frequencies are shown on each side of the new center frequency.

Those skilled in the art will appreciate that FIGS. 2-4 are for illustrative purposes and do not represent a precise transfer characteristic for a particular low-pass boost filter. In the above example, a low-pass boost filter was used, but in other examples, various other filters could be used, such as notch filters, band-pass filters, and high-pass filters to name a few examples. In the above example, the transfer characteristic was shifted in the frequency domain, but in other examples, the transfer characteristic could be broadened, narrowed, raised, lowered, and/or modified in some other fashion in proportion to the varying data rate.

Figure 5:
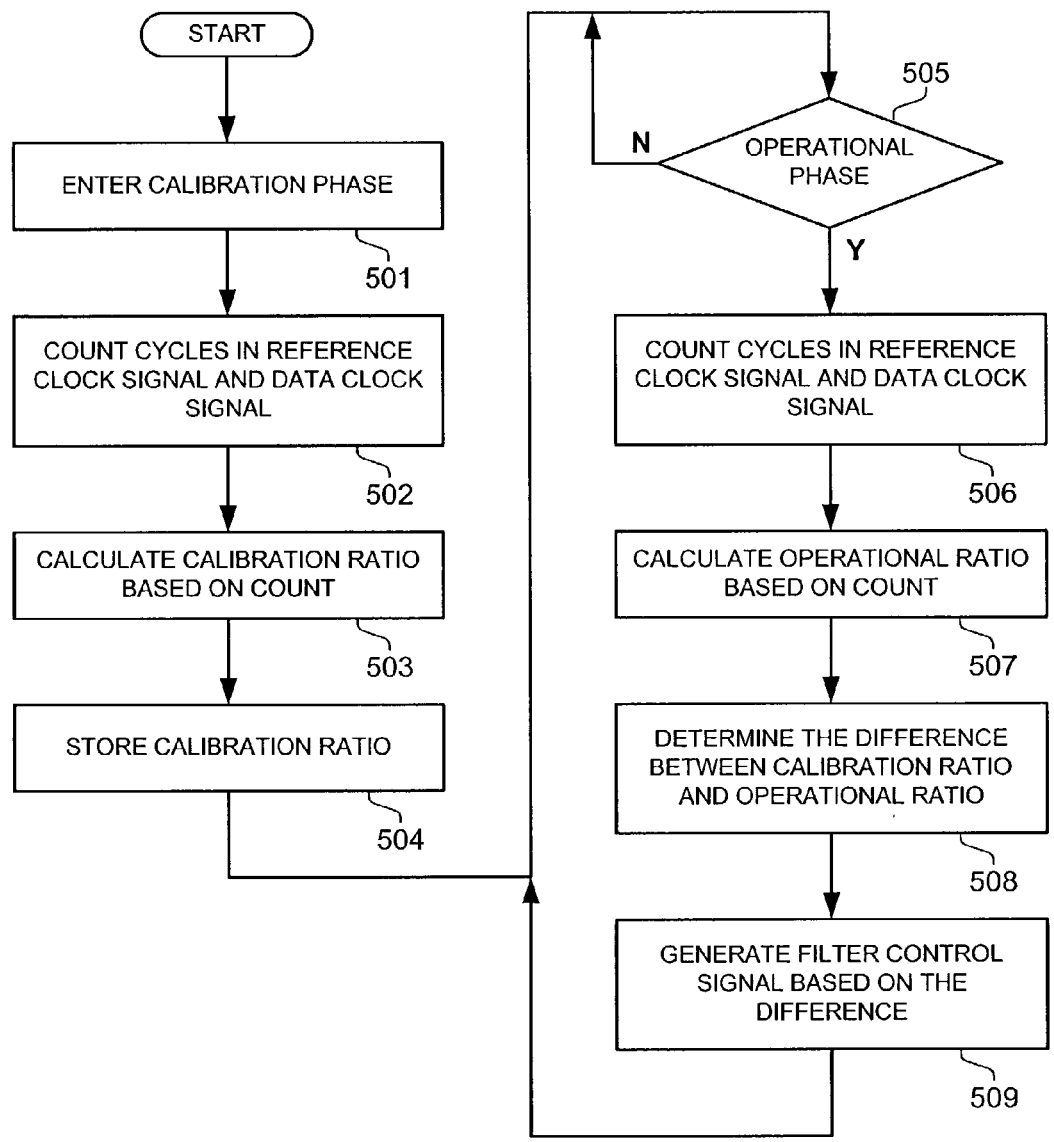
FIG. 5 illustrates the operation of a filter control circuit in an example of the invention.

FIG. 5 illustrates the operation of filter control circuit 106 in an example of the invention. The reference numbers from FIG. 5 are indicated parenthetically below. Filter control circuit 106 starts in the calibration phase (501). In the calibration phase, filter control circuit 106 counts the cycles in reference clock signal 121 and the cycles in data clock signal 122 (502). The count could be for a set number of cycles in reference clock signal 121. Filter control circuit 106 calculates a calibration ratio that could equal the cycle count for reference clock signal 121 divided by the cycle count for data clock signal 122 (503). Filter control circuit 106 stores the calibration ratio (504).

Filter control circuit 106 determines if analog filter 102 is in the operational phase (505). If so, filter control circuit 106 counts the cycles in reference clock signal 121 and the cycles in data clock signal 122 (506). The count could be for the set number of cycles in reference clock signal 121. Filter control circuit 106 calculates an operational ratio that could equal the cycle count for reference clock signal 121 divided by the cycle count for data clock signal 122 (507). Filter control circuit 106 determines the difference between the calibration ratio and the operational ratio (508). Filter control circuit 106 generates filter control signal 125 based on this difference to adjust transfer characteristic of analog filter 102 (509). The process steps 506-509 could be repeated continuously or periodically.

The invention claimed is:

1. Processing circuitry to process an analog signal having a varying data rate, the processing circuitry comprising:
   an analog filter configured to filter the analog signal based on a transfer characteristic to transfer a filtered signal and to adjust the transfer characteristic in proportion to the varying data rate in response to a filter control signal; and
   a filter control circuit configured to determine a first relationship between a data clock signal corresponding to the varying data rate and a reference clock signal during a calibration phase, determine a second relationship between the data clock signal and the reference clock signal during an operational phase, and to generate the filter control signal based on a difference between the first relationship and the second relationship to adjust the transfer characteristic in proportion to the varying data rate.

2. The processing circuitry of claim 1 wherein the filter control circuit is configured to determine a first reference clock count and a first data clock count during the calibration phase, determine a second reference clock count and a second data clock count during the operational phase and wherein the first relationship comprises a first ratio of the first reference clock count and the first data clock count, and the second relationship comprises a second ratio of the second reference clock count and the second data clock count.

3. The processing circuitry of claim 1 wherein the transfer characteristic is configured for an expected data rate during a calibration phase and the transfer characteristic is adjusted in proportion to the varying data rate during an operational phase.

4. The processing circuitry of claim 1 wherein the varying data rate corresponds to a varying data speed of a tape drive.

5. The processing circuitry of claim 4 wherein the analog filter and the filter control circuit comprise read channel circuitry for a tape drive.

6. The processing circuitry of claim 1 wherein the varying data rate corresponds to a varying data speed of an optical drive.

7. The processing circuitry of claim 6 wherein the analog filter and the filter control circuit comprise read channel circuitry for an optical drive.

8. A method of processing an analog signal having a varying data rate, the method comprising:
   filtering the analog signal based on a transfer characteristic to transfer a filtered signal;
   determining a first relationship between a data clock signal corresponding to the varying data rate and a reference clock signal during a calibration phase, determining a second relationship between the data clock signal and the reference clock signal during an operational phase to generate a filter control signal based on a difference between the first relationship and the second relationship to adjust the transfer characteristic in proportion to the varying data rate; and
   adjusting the transfer characteristic in proportion to the varying data rate in response to the filter control signal.

9. The method of claim 8 wherein determining the first relationship comprises determining a first reference clock count and a first data clock count during the calibration phase, and determining the second relationship comprises determining a second reference clock count and a second data clock count during the operational phase, and wherein the first relationship comprises a first ratio of the first reference clock count and the first data clock count, and the second relationship comprises a second ratio of the second reference clock count and the second data clock count.

10. The method of claim 8 wherein the transfer characteristic is configured for an expected data rate during a calibration phase and the transfer characteristic is adjusted in proportion to the varying data rate during an operational phase.

11. The method of claim 8 wherein the varying data rate corresponds to a varying data speed of a tape drive.

12. The method of claim 11 wherein the analog filter and the filter control circuit comprise read channel circuitry for a tape drive.

13. The method of claim 8 wherein the varying data rate corresponds to a varying data speed of an optical drive.

14. The method of claim 13 wherein the analog filter and the filter control circuit comprise read channel circuitry for an optical drive.

* * * * *